April 9, 1963
J. W. SCHAEFER
3,084,814
BOTTOM UNLOADER FOR STORAGE STRUCTURES
Filed Aug. 1, 1960
4 Sheets-Sheet 1
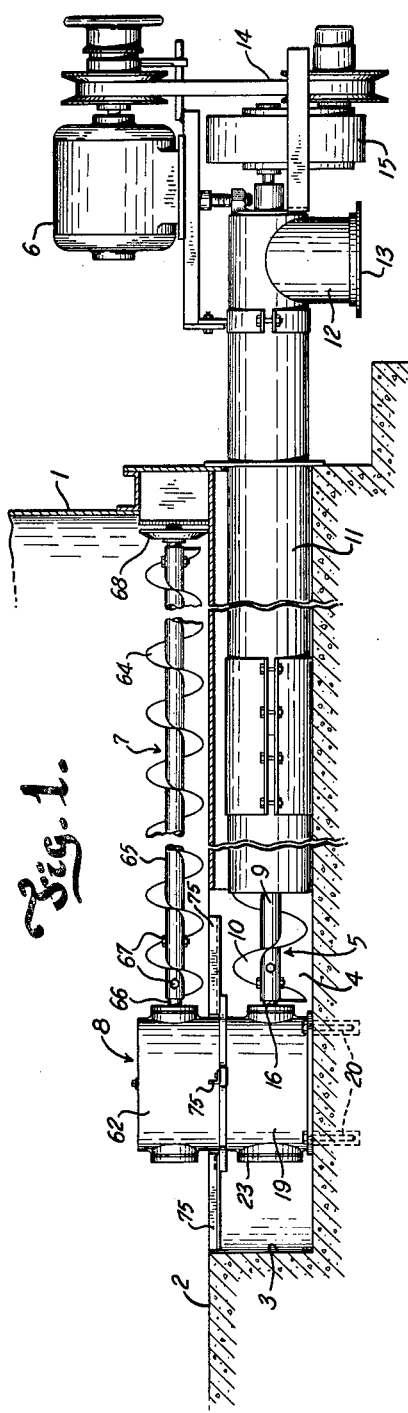
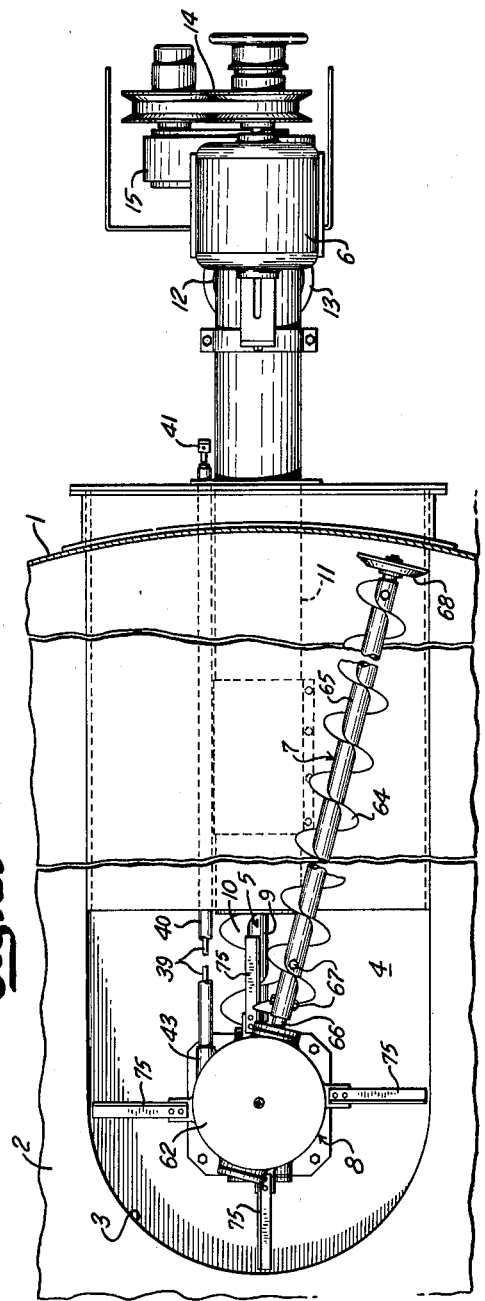
INVENTOR.
John W. Schaefer
BY
*Andrus & Starke*
*Attorneys*

INVENTOR.
John W. Schaefer
BY
Andrus & Starke
Attorneys

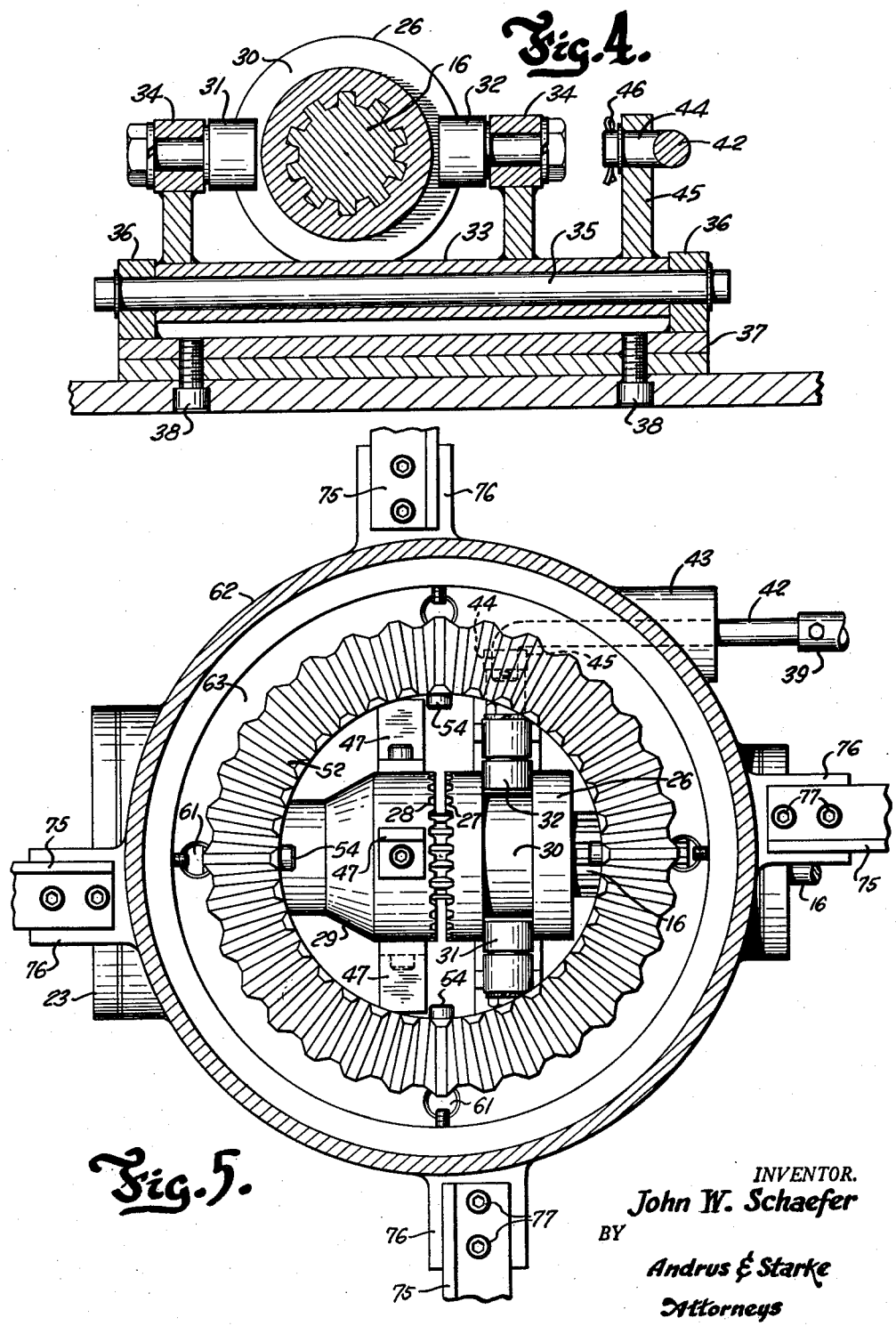

April 9, 1963 J. W. SCHAEFER 3,084,814
BOTTOM UNLOADER FOR STORAGE STRUCTURES
Filed Aug. 1, 1960 4 Sheets-Sheet 4

INVENTOR.
John W. Schaefer
BY
Andrus & Starke
Attorneys

United States Patent Office 3,084,814
Patented Apr. 9, 1963

3,084,814
BOTTOM UNLOADER FOR STORAGE STRUCTURES
John W. Schaefer, Kankakee, Ill., assignor, by mesne assignments, to A. O. Smith Harvestore Products, Inc., Kankakee, Ill., a corporation of Delaware
Filed Aug. 1, 1960, Ser. No. 46,581
20 Claims. (Cl. 214—17)

This invention relates to a bottom unloader for storage structures and particularly to a pair of stacked auger type loaders for completely removing silage and the like from relatively large vertically disposed storage structures.

Silage and many other materials are stored in flat bottom cylindrical housings or silos. Because of the adverse effect upon the stored material of air and other foreign elements, the housings are sealed to prevent entrance of such elements. A discharge opening through which material is automatically discharged is preferably constructed to prevent entrance of contaminating foreign elements. For example, U.S. Patent 2,233,085 to W. M. Schweickart et al., and U.S. Patent 1,275,558 to J. H. Holmgreen each discloses a storage structure having a pair of stacked discharge augers radially arranged to provide for discharge of the material without allowing substantial entrance of contaminating elements.

As shown in the Schweickart patent, a discharge auger is radially mounted within a trough beneath the bottom floor of the storage unit. The auger communicates with a central discharge opening in the floor and with a discharge outlet exteriorly of the storage unit for moving material outwardly to the exterior of the unit. Material is continuously introduced into the central discharge opening by a sweep auger which is radially mounted within the storage unit for rotation about the axis of the storage unit. The discharge auger is positively driven through a suitable power means. A coupling mechanism connects the sweep auger to the inner end of the discharge auger to simultaneously cause the sweep auger to rotate about its own axis and to also continuously sweep across the floor of the storage unit. The sweep auger continuously cuts away the bottom layer of the materials and propels it to the central discharge opening. The dual discharge substantially prevents exposure of the mass within the storage unit to contaminating influences and the like.

The present invention is particularly directed to a reliable and durable coupling unit for connecting the driven discharge means to the sweep means to simultaneously rotate the sweep means about its own axis and continuously angularly index the sweep auger within the storage structure.

Generally, in accordance with the present invention, a discharge means is mounted within a suitable channel beneath the storage unit and a sweep means is mounted within the storage unit. A transmission unit interconnects the inner end of the discharge means and the adjacent end of the sweep means to permit simultaneous rotation of the two means. The transmission unit includes a lower housing which is stationarily secured within the discharge opening and an upper housing which is rotatably mounted upon the lower housing.

The upper and lower housings define a generally split tubular housing or enclosure having a supporting and indexing assembly disposed within the tubular housing. The supporting and indexing assembly includes bearing members secured to the respective housings to rotatably support the upper housing upon the lower housing. The supporting and indexing assembly further includes means connecting the upper housing to the transmission unit to impart rotary motion to the upper housing whenever power is being transmitted to the sweep means.

In accordance with one aspect of the invention, a friction drive and bearing plate-like member is mounted between suitable bearings carried by the facing ends of the two housings. A ring drive member is secured centrally to the friction member and includes upper and lower drive connecting means, preferably gears or the like. The lower drive means is driven through the drive for the discharge means to rotate the ring drive member incident actuation of the discharge auger. The upper drive means is coupled to the sweep means to continuously drive the sweep means to carry the stored material to the central opening. The friction member which is attached to the ring member rotates with the ring drive member and the frictional forces between the friction member and the bearing of the upper housing cause the upper housing to be continuously angularly indexed within the storage structure.

The indexing action of the sweep means is not positive but is rather controlled by the resistance acting in a horizontal plane through the sweep means. This indexing is aided by the normal "creep" of the sweep arm drive carried by the upper portion of the ring member.

Relatively large bearing surfaces can be provided between the friction and bearing plate and the respective bearings on the upper and lower housings to provide a small unit bearing load. Consequently relatively long bearing life is obtained and minimum maintenance is required. The loads applied to the gear assembly are transmitted through the bearings directly to the lower housing. The construction provides a very simple, economical and stable coupling of the sweep means to the drive means.

In accordance with another aspect of this invention, a positive drive may be provided to the upper housing. A drive and bearing assembly is provided within the tubular housing or enclosure to support the upper housing upon the lower housing and to positively drive the upper housing. A planetary gear system couples the transmission unit to the upper housing to provide a slow positive sweep rotation to the upper housing when the sweep means is actuated.

In accordance with another aspect of the present invention, a clutch unit may be mounted between the discharge means and the connection of the drive coupling to the ring member. The clutch provides a simple, remote and essentially instantaneous control of the drive without complete stopping of the prime mover or discontinuance of material flow from the lower discharge trough or passage.

The present invention provides a very economical and readily fabricated unloader which requires a very minimum of service. The unloader allows complete sealing of the storage structure and also permits complete discharge of the material stored within the unit within practical and economical limits.

The drawings furnished herewith illustrate the best mode presently contemplated for carrying out the invention.

In the drawings:

FIG. 1 is a side elevational view of a storage unit having a bottom unloader constructed in accordance with the present invention;

FIG. 2 is a fragmentary top elevational view taken of FIG. 1;

FIG. 4 is a view taken on line 4—4 of FIG. 3 illustrating more clearly the actuation of the clutch in accordance with the preferred embodiment of the present invention;

FIG. 5 is a horizontal section through the gear assembly shown in FIG. 3 and taken on line 5—5 of FIG. 3;

Figure 3:
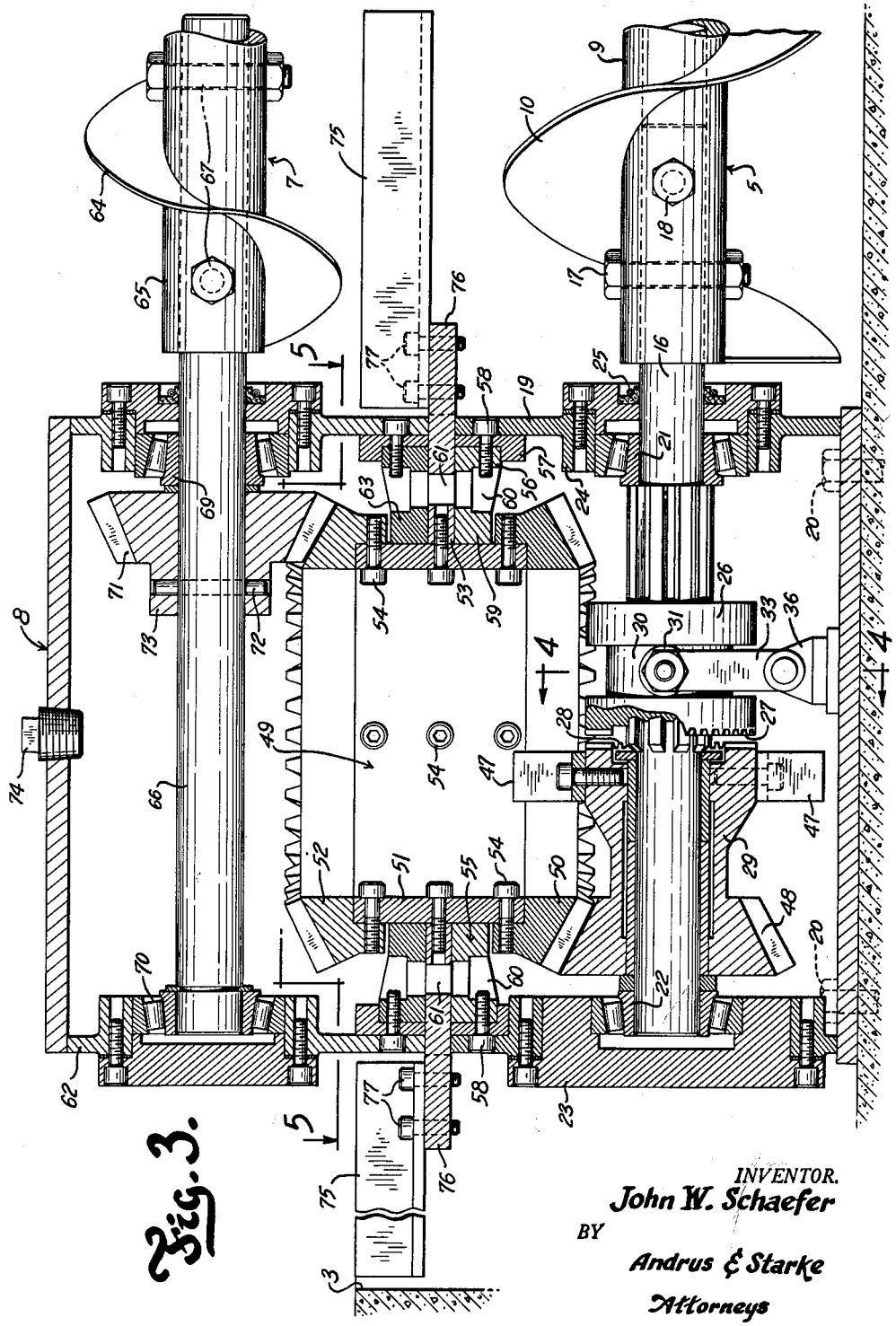
FIG. 3 is an enlarged vertical section through the gear and clutch assembly shown in FIG. 1 and constructed in accordance with the present invention.

Referring to the drawings, and particularly to FIGS. 1 and 2, a fragmentary view of a conventional silo or similar storage structure 1 is illustrated which is adapted to store silage or other suitable material, not shown. The silo includes a floor area 2 having a central discharge opening 3 which is in communication with and forms a part of a discharge channel 4 extending radially outwardly beneath the floor. A discharge auger 5 is rotatably mounted within the channel 4 and adapted to be driven by an electric motor 6 to remove silage through the channel 4 in a conventional manner. A sweep auger 7 is rotatably mounted within the silo 1 immediately adjacent the floor 2 and is adapted to be rotated about its own axis and also to travel angularly over the floor of the silo 1 to continuously remove a portion of the stored material and to carry it into the central discharge opening 3 and thus into the channel 4. A clutch and gear coupling 8 is centrally mounted within the discharge opening 3 and is adapted to selectively connect the sweep auger 7 to the discharge auger 5 to apply power to drive the sweep auger as more fully described hereinafter.

The illustrated auger 5 is generally of a conventional construction and includes a shaft 9 carrying a spiral blade 10. A close fitting tube 11 is concentrically secured about the spiral blade 10 for guiding the material outwardly through channel 4 in a conventional manner. The auger 5 and tube 11 extend outwardly generally coextensively and terminate in a discharge outlet 12 which is located exteriorly of the silo. A cover 13 is releasably secured over outlet 12 to seal the outlet 12 when material is not being discharged.

The electric motor 6 is coupled to the outer end of the auger shaft 9 through a conventional pulley and gear assembly 14 and speed reducer 15. The electric motor 6 may be of any desirable construction having sufficient power output to simultaneously drive the auger 5 and the sweep auger 7 as more fully set forth hereinafter.

The inner end of the auger shaft 9 is recessed and telescoped over a clutch shaft 16 which extends into and constitutes a part of the clutch and gear coupling 8. A pair of axially spaced bolts 17 and 18 pass through the clutch shaft 16 and the shaft 9 to rigidly interconnect the clutch shaft for simultaneous rotation with the shaft 9.

Referring particularly to FIGS. 3–5, the clutch and gear coupling 8 includes a lower cup-shaped housing 19 which is secured by a plurality of bolts 20 to the bottom of the channel 4 adjacent central opening 3 in floor 2.

The clutch shaft 16 extends through an opening in the housing 19 having a tapered roller bearing 21 rotatably supporting the adjacent portion of the shaft 16. The opposite end of shaft 16 terminates adjacent the diametrically opposite portion of the housing 19 and a tapered roller bearing 22 is secured within an opening in housing 19 to rotatably support the innermost end of the shaft 16.

The tapered roller bearing 22 is carried by a support 23 which is removably secured within the opening in housing 19 to maintain the housing liquid tight. The tapered roller bearing 21 is supported by an encircling ring boss 24 formed in the housing 19. A lip seal 25 is removably attached to the ring boss 24 to seal the opening of the shaft and maintain the housing generally liquid tight.

The clutch shaft 16 is splined within the housing 19 and a correspondingly inner splined clutch collar 26 is slidably mounted upon the shaft 16. Clutch teeth 27 are formed on the inner axial end face of the collar 26 and are adapted to be selectively meshed with correspondingly shaped clutch teeth 28 formed on an adjacent axial end of a pinion and clutch member 29.

The clutch collar 26 includes an annular slot 30 formed in the central circumferential area of the collar 26. Oppositely disposed cam followers 31 and 32 are mounted within the annular slot 30 on diametrically opposite sides of the collar 26 by a U-shaped rocker arm 33 having suitable upstanding bearings 34 which are adapted to rotatably support the followers 31 and 32. The arm extends transversely beneath the collar 22 and is pivotally mounted upon a correspondingly mounted shaft 35. End bearings 36 are provided for opposite ends of the shaft 35 and are stationarily secured within the housing by a suitable rigid mounting plate 37. Cap screws 38 extend upwardly through the base of the housing 19 and thread into correspondingly tapped openings in the mounting plate 37. The pivoting of the rocker arm 33 results in axial movement of the collar 26 upon the clutch shaft 16 to selectively establish engagement and disengagement of the clutch teeth 27 and 28.

Referring particularly to FIGS. 2, 4 and 5, an actuating rod 39 is slidably mounted within an outer shield or guide 40 immediately adjacent the discharge auger 5 within the channel 4. The rod 39 and guide 40 extend parallel to the discharge auger 5 beneath the floor 2 and the rod 39 extends from guide 40 exteriorly of the silo 1 and terminates in a hand knob 41 for push-pull actuation. The inner end of rod 39 is secured to a shaft 42 which extends through a sliding journal 43 in the lower housing 19 and terminates in an L-shaped end 44 within housing 19. A control arm 45 is welded or otherwise rigidly secured to the rocker arm 33 and is apertured to receive the offset portion of the L-shaped end 44 of shaft 42. A cotter key 46 projects through an opening in the L-shaped end 44 and interlocks the shaft 42 to the arm 45. Consequently, the push-pull on the knob 41 and the attached actuating rod 39 is transmitted to the rocker arm 33 through the shaft 42 and the arm 45 to selectively position the collar 26. The clutch teeth 27 of collar 26 are thereby selectively moved into engagement and disengagement with the clutch teeth 28 of the pinion and clutch member 29.

The illustrated pinion and clutch member 29 is generally an elongated tubular member which is journaled for independent rotation about the clutch shaft 16 within the housing 19 as shown in FIG. 3. The one end face of the pinion and clutch member 29 is enlarged and carries the clutch teeth 28 immediately adjacent the clutch teeth 27 of collar 26.

A plurality of radially extending slingers 47 are bolted or otherwise secured to the member 29 immediately adjacent the clutch teeth 28. The slingers 47 are adapted to splash oil or the like, not shown within the clutch and gear coupling 8 to lubricate the several moving components.

A bevel gear 48 is integrally formed on the opposite end of the pinion and clutch member 29 within the housing 19 for rotation about the axis of the clutch shaft 16. A ring gear unit 49 is supported for rotation about a vertical axis and includes a bevel gear 50 in mesh with the bevel gear 48 for driving the gear unit 49.

Referring particularly to FIGS. 3 and 5, the ring gear unit 49 includes a central gear support ring 51 coaxially mounted in housing 19. The lower bevel gear 50 is bolted or otherwise rigidly secured to the lower end of the support ring 51 and arranged in constant engagement with the bevel gear 48 on the clutch shaft 16. A similar bevel gear 52 is bolted or otherwise rigidly interconnected to the upper end of the support ring 51 and arranged to drive the sweep auger 7 about its own axis.

A friction drive and bearing plate 53 is secured to the outer central circumference of the support ring 51 by a series of circumferential bolts 54 which extend through the support ring 51 and thread into suitably tapped openings in the inner circumference of the friction and bearing plate 53. The friction and bearing plate 53 projects radially outwardly from the support ring 51 and terminates generally coincident with the outer diameter of the housing 19. An annular bearing 55 is secured within housing 19 with an upper bearing surface in the plane of the upper edge of housing 19 to rotatably support the ring gear unit 49 with the vertical axis coincident with the axis of the gear housing 19.

The annular bearing 55 is formed of bronze or any suitable bearing material which is adapted to support the gear unit 49. The annular bearing 55 has a generally inverted cup-shaped cross-section with a depending leg 56 disposed within an L-shaped bearing bracket 57 which is welded or otherwise rigidly secured within the upper end of the housing 19. A plurality of circumferentially distributed bolts 58 project through suitable aligned openings in the housing 19 and the bracket 57 and thread into corresponding tapped openings in the depending leg 56 of the bearing 55. The bearing 55 is thus rigidly attached to the upper end of the housing and provides a vertical thrust support for the ring gear unit 49.

The annular bearing 55 also includes an inner depending leg 59 which bears on the outer surface of the support ring 51 and constitutes a radial sleeve bearing for the ring gear unit 49. A series of circumferentially spaced radial braces 60 integrally extend between the depending legs 56 and 59 of bearing 55 to provide a strong bearing unit. Aligned openings 61 in the bearing plate 53 and the bearing 55 allow circulation of lubricating fluid about the ring gear unit 49. The friction and bearing plate 53 thus supports the ring gear unit 49 with the upper bevel gear 52 rotating above the level of the gear housing 19 and within a sweep auger gear housing 62.

The sweep auger gear housing 62 generally is an inverted cup-shaped member similar to the housing 19. An annular bearing 63 generally similar to the bearing 55 is similarly secured to the lower end of the housing 62 and rests upon the upper surface of the friction and bearing plate 53.

The frictional forces between the friction drive and bearing plate 53 and the annular bearing 63 couple the housing 62 to the friction drive and bearing plate 53 and thus to the ring gear unit 49. Consequently, the rotation of the ring gear unit 49 is transferred to the housing 62 which is adapted to rotatably support the sweep auger 7 in the following manner.

Referring particularly to FIGS. 1–3, the sweep auger 7 is generally similar to auger 5 and includes a spiral blade 64 rigidly secured to an auger shaft 65. The auger 7 extends from the housing 62 and terminates adjacent the wall of silo 1. The innermost end of the auger shaft 65 is recessed and telescopically bolted to a drive shaft 66 by bolts 67 similar to the connection of auger shaft 9 to the clutch shaft 16. A wheel 68 is rotatably secured on the outer end of auger 7 and rides on the floor of the silo 1 to support the outer end of auger 7.

The housing 62 is driven about the vertical axis of the silo 1 by the friction forces as previously described and angularly positions the drive shaft 66 and attached auger 7. The shaft 66 also rotates the auger 7 about its own axis to continuously move material, not shown, into the central discharge opening 3.

Referring particularly to FIGS. 3 and 5, the drive shaft 66 extends into the housing 62 and is secured at the entrance to the housing by a tapered roller bearing 69 and at the innermost end by a tapered roller bearing 70. The bearings 69 and 70 are generally similar to the bearings for the clutch shaft 16 and no further description is given.

A bevel gear 71 is rigidly secured to the drive shaft 66 immediately adjacent the inner end of the tapered roller bearing 69 and is arranged in constant mesh with the bevel gear 52 of the ring gear unit 49. A pin 72 extends through aligned openings in a hub 73 on the bevel gear 71 and the drive shaft 66 to rigidly interconnect the bevel gear 71 to the shaft 66 and thereby drive the shaft 66 incident rotation of the ring gear unit 49.

An oil plug 74 removable closes a central opening in the upper wall of the auger housing 62 to allow introduction of oil, not shown, into the unit to maintain the operation of the several gears in a lubricating medium.

When the collar 29 is positioned on shaft 16 to engage the clutch teeth 27 and 28 the ring gear unit 49 is driven by bevel gear 48. The bevel gear 52 simultaneously drives the gear 71 and attached sweep auger 7 of the axis or shaft 66. Simultaneously, the friction forces between the annular bearing 63 and the friction drive and bearing plate 53 establish a rotating force on the housing 62 and sweep auger 7 travels across the floor of silo 1 and moves the stored material, not shown, to the central opening 3 from which it is discharged by the rotation of discharge auger 5.

Referring particularly to FIG. 2, four equicircumferentially spaced paddles 75 span the discharge opening 3 between the clutch and gear coupling 8 and the outer edge of the discharge opening 3. Each of the paddles 75 is generally an angle-shaped iron member having a horizontal leg and a vertically upstanding leg. The horizontal leg portions of the paddle 75 are rigidly interconnected to suitable projections 76 of the friction drive and bearing plate 53 by bolts 77. The projections 76 are integrally formed with the plate 53 in the illustrated embodiment of the invention and project outwardly slightly of the housings 62 and 19. The rotation of the friction drive and bearing plate 53 moves the paddles across the entrance to opening 3 and continuously levels and spreads the material within the discharge opening 3.

The operation of the illustrated embodiment of the invention is summarized as follows.

The electric motor 6 is energized to drive the discharge auger 5. The actuating handle 41 is preferably pulled outwardly to move the collar 26 to disengage the clutch teeth 27 and 28 during the starting of motor 6. To withdraw material from the silo 1, the actuating handle 41 is pushed inwardly and through the rocker arm assembly 33 causing the clutch collar 26 to move towards the pinion and clutch member 29 to engage clutch teeth 27 and 28.

The bevel gear 48 which constitutes a part of the pin and clutch member 29 rotates and drives the bevel gear 50 of the ring gear unit 49.

The upper bevel gear 52 rotates and drives the attached meshing bevel gear 71 carried by the drive shaft 66 of sweep auger 7. The rotation of sweep auger 7 about the auger shaft 65 continuously draws material centrally into the discharge opening 3.

Simultaneously, the rotation of the ring gear unit 49 is transmitted through the friction and bearing plate 53 and the annular bearing 63 to the housing 62. The frictional forces rotate the housing 62 about the vertical axis through the housing and the ring gear unit 49 and maintain the attached auger 7 in constant engagement with the material immediately adjacent the floor 2 of silo 1.

The friction coupling of the housing 62 and the attached sweep auger 7 to the ring gear unit 49 is simple and reliable. The indexing action of the sweep auger 7 is controlled by the resistance acting in a horizontal plane against the sweep auger. Consequently, abnormal shock forces are not established on the sweep auger 7 or the interconnecting gear system. The indexing is also aided by normal creep of the sweep auger gear 71 during rotation of ring gear unit 49.

The securement of the leveling vanes or paddles 75 to the friction drive and bearing plate 53 provides a very simple and positive means for continuously introducing and distributing material within the discharge opening 3.

The discharge auger 5 drives the sweep auger to provide means for withdrawing material from a silo or similar structure and continuously indexes the auger 7 to completely clear the floor of the structure.

The support of the ring gear unit 49 upon the annular bearing 55 directly transmits the bearing load to the housing and provides a relatively large bearing surface with the resultant small unit bearing load.

Further, the mounting of the ring gear unit 49 is exceptionally stable and exceptionally long bearing and gear life is obtained. A very minimum of maintenance is required. The supporting structure of the auger housings 7 and the ring gear unit 49 is economical and simple and is readily adapted to manufacturing requirements.

Figure 6:
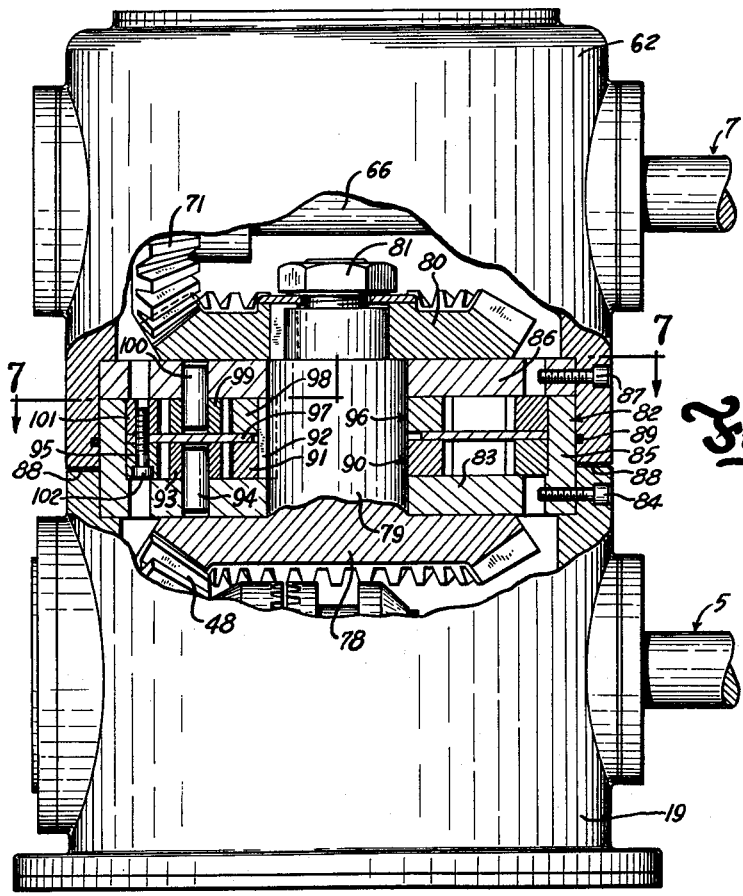
FIG. 6 is a view similar to FIG. 3 illustrating another embodiment of the invention having a positive sweep indexing drive.
Figure 7:
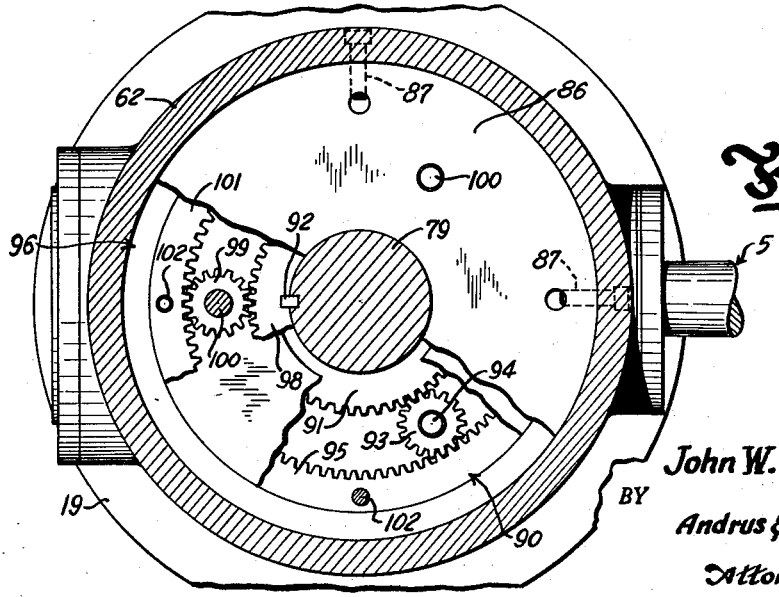
FIG. 7 is a view taken on line 7—7 of FIG. 6.

Referring particularly to FIGS. 6 and 7 in the drawings, a coupling for the augers is shown incorporating a positive drive between the output side of the clutch and the upper housing. Generally, corresponding elements in the embodiments of the invention shown in FIGS. 6 and 7 and in FIGS. 1–5 are given corresponding numbers for purposes of simplicity and clarity of explanation.

Referring particularly to FIG. 6, the lower housing 19 and the upper housing 62 form a coupling unit 8 as in the previous embodiment. Discharge auger 5 and a sweep auger 7 are carried by the respective lower and upper housings. A clutch unit connects the motor 6, not shown in FIGS. 6 and 7, to drive the augers 5 and 7 and the upper housing 62 about their respective axis, in the following manner.

The bevel gear 71 carried by the sweep auger 7 is shown in FIG. 6 as secured to the innermost end of the shaft 66. In the embodiment of the invention illustrated in FIG. 6, the bevel gear 71 is coupled to the bevel gear 48 which is driven by the clutch unit by a modified gear unit mounted within the housings 19 and 62, as follows.

A bevel gear 78 meshes with the gear 48 and includes an integral gear shaft 79 projecting coaxially upwardly through the housings 19 and 62. Shaft 79 terminates immediately beneath the sweep auger shaft 66. A bevel gear 80 is secured upon a reduced upper portion of the upper end of the shaft 79 by a lock nut 81 in mesh with the bevel gear 71. When the clutch unit is engaged to drive the bevel gear 48 the rotary motion is transmitted through the bevel gears 78 and 80 to the bevel gear 71 to rotate the sweep auger 7 about its own axis and thereby transport material from within the storage unit into the central opening.

A drive and bearing unit 82 is disposed between the gears 78 and 80 to locate and support the gear shaft 79 and thus the bevel gears 78 and 80. The drive and bearing unit 82 also rotatably supports the upper housing 62 upon the lower housing 19 and couples the upper housing 62 to the shaft 79 for positive indexing of the auger 7 within the storage structure, as hereinafter described.

A bearing ring 83, forming a part of the unit 82, is rigidly secured within the upper portion of the housing 19 by a plurality of circumferentially distributed bolts 84. The ring 83 extends horizontally into engagement with the shaft 79 immediately adjacent the backside of the bevel gear 78 to form a radial bearing for the gear shaft 79. A vertical outer cage wall 85 is integrally formed with the bearing ring 83 immediately adjacent the inner surface of the housing 19. The cage wall 85 projects upwardly and telescopes into the housing 62 in sliding engagement with the inner surface of the lower end of the housing 62. A bearing ring 86 is secured to the upper housing 62 by a plurality of circumferentially distributed bolts 87. The bearing ring 86 extends inwardly into abutting bearing engagement with the shaft 79 and also constitutes a radial bearing therefor. The bearing ring 86 further rests upon the upper end of the adjacent wall 85 to rotatably support the housing 62 upon the housing 19. The bearing ring 86 is located to establish a slight space 88 between the adjacent edges of the housings 19 and 62 to allow relatively free rotation of the housing 62. A sealing gasket ring 89 is disposed within a suitable recess on the inner surface of the lower portion of the housing 62 and engages the outer surface of the bearing wall 85 to provide a positive fluid seal.

In the illustrated embodiment of the invention, the upper bearing ring 86 is positively driven to continuously index the attached housing 62 and the sweep auger 7 within the storage structure.

The drive in bearing unit 82 includes a primary planetary gear assembly 90 connected to the integral gear shaft 79 immediately adjacent the upper surface of the bearing ring 83. A primary sun gear 91 is secured to the shaft 79 for simultaneous rotation therewith by a conventional key 92. A plurality of primary planet gears 93 are circumferentially spaced about the sun gear 91 and each is rotatably supported by a planet gear shaft 94 rigidly secured within suitable openings in the bearing ring 83 to support the planet gears 93 in constant mesh with the sun gears 91. A primary ring gear 95 is disposed between the vertical wall 85 and the planet gears 93 with the outer circumference of the ring gear 95 bearing against the vertical outer wall 85. The ring gear 95 is free to rotate and consequently when the shaft 79 is driven, the rotation of the sun gear 91 is transmitted through the planet gears 93 to drive the ring gear 95.

A secondary planetary gear assembly 96 is mounted above the primary planetary gear assembly 90 and spaced therefrom by an annular spacing and bearing plate 97. The gear assembly 96 includes a sun gear 98 keyed to the shaft 79 by key 92 for synchronous rotation with the primary sun gear 91. A plurality of secondary planet gears 99 are equicircumferentially spaced about the sun gear 98 and rotatably supported by planet gear shafts 100 which are rigidly fixed within suitable openings in the upper bearing and drive ring 86. A ring gear 101 of the planetary gear assembly 96 is disposed in engagement with the planet gears 99 between the latter and the vertical wall 85. A plurality of equicircumferentially displaced tie bolts 102 project upwardly through the ring gear 95 and thread into aligned and suitably tapped openings in the ring gear 101 to rigidly tie the ring gear 101 to the ring gear 95. Consequently, these gears must rotate at the same speed.

As previously described, the rotation of the shaft 79 is transmitted through the planetary gear assembly 90 to drive the ring gear 95. The ring gear 101, which is tied thereto by tie bolts 102, is driven at the same rotational speed. Simultaneously, the shaft 79 drives the sun gear 98 at a somewhat increased speed. The secondary planet gears are driven by the differential rotational motion of the secondary sun gear 98 and the ring gear 101. The differential motion between the secondary sun gear and the secondary ring gear is thus imparted to the bearing plate 86 through the secondary planet gear shafts 100. The bearing plate 86 is rigidly tied to housing 62 by bolts 87 and the housing 62 is thus continuously rotated at a reduced speed to index the auger 7.

The embodiment of the invention illustrated in FIGS. 6 and 7 generally functions to rotate augers 5 and 7 about their own axis in the same manner as the embodiment illustrated in FIGS. 1–5.

However, in the embodiment of the invention illustrated in FIGS 6 and 7, whenever the power is being transmitted to rotate the sweep auger 7, power is simultaneously fed through the drive and bearing unit 82 to positively index the upper housing 62 and thus the attached auger 7 about the central axis through the housings 19 and 62.

The planetary system allows substantial reduction in the rotation speed of the indexing housing 62 and the attached auger 7. Consequently, the forces established on the sweep auger 7 as it is moved circumferentially into the stored material do not become excessive or dangerous.

The upper housing 62 is rotatably carried by the bearing ring 86 upon the upper end of the vertical wall 85 and transmits all thrust forces directly to the housing 19.

The bearing rings 83 and 86 also function to rotatably support the shaft 79 and the attached bevel gears 80 and 82. The bearing rings 83 and 86 further function to form a cage assembly for the planetary gear assemblies 90 and 96.

The positive indexing gear unit of the present invention permits a positive gear connection within the restricted space requirements imposed by the construction of the gear unit connecting the discharge auger 5 to the sweep auger 7.

The clutch system of the invention provides a very ready means for remote control and eliminates the necessity for entering any structure for effecting engagement or drive of the sweep auger.

The present invention thus provides a reliable and durable coupling of a dual bottom unloading unit which is readily adapted to low cost and commercial production.

Various modes of carrying out the invention are contemplated as being within the scope of the following claims particularly pointing out and distinctly claiming the subject matter which is regarded as the invention.

I claim:

1. An unloader for removing material from a structure and having a sweep conveyor means and a discharge conveyor means within the structure beneath the sweep conveyor means and having a prime mover coupled to drive the discharge conveyor means, which comprises an upper inverted cup-shaped housing and a lower cup-shaped housing defining a divided tubular enclosure, a gear train mounted within the enclosure and having an input within the lower housing connected to the discharge conveyor means and an output within the upper housing connected to the sweep conveyor means, and a drive means centrally mounted within the tubular enclosure between the input and output of the gear train and forming a support for the gear train, said drive means including an input connected to be driven by the gear train and an output coupled to the upper inverted housing.

2. An unloader for removing material from a structure and having a sweep conveyor means and a discharge conveyor means, which comprises a centrally divided transmission enclosure defining an upper housing rotatably supporting the sweep conveyor means and a lower housing rotatably supporting the discharge conveyor means, a transmission unit mounted within the enclosure including an upper gear in the upper housing operatively connected to drive the sweep conveyor means and a lower gear in the lower housing operatively connected to be driven by the discharge conveyor means with the gears connected by a common support, and a drive and bearing assembly coupled to the common support to rotatably mount the gears and coupled to the upper housing to drive the upper housing and to the lower housing to rotatably support the upper housing.

3. An unloader for removing material from a structure and having a sweep conveyor means and a discharge conveyor means, which comprises a centrally divided transmission enclosure defining an upper housing rotatably supporting the sweep conveyor means and a lower housing rotatably supporting the discharge conveyor means, a transmission unit mounted within the enclosure including an upper gear in the upper housing operatively connected to drive the sweep means and a lower gear in the lower housing operatively connected to be driven by the discharge means and including a common shaft connected to said gears within said housings and mounted coaxially with the enclosure, a drive and bearing assembly including a radial bearing means secured to the housings and engaging the shaft to radially locate the gears and a thrust bearing member secured to the shaft and resting upon the radial bearing means to rotatably mount the gears, said drive and bearing assembly including drive means connected to the common shaft and to the upper housing to drive the upper housing, and bearing means rotatably supporting the upper housing upon the lower housing.

4. An unloader for removing material from a structure and having a sweep conveyor means and a discharge conveyor means, which comprises a centrally divided transmisison enclosure defining an upper housing rotatably supporting a sweep means and a lower housing rotatably supporting a discharge means, a transmission unit mounted within the enclosure including an upper ring gear in the upper housing operatively connected to drive the sweep means and a lower ring gear in the lower housing operatively connected to be driven by the discharge means and including a common transmission shaft connecting the upper ring gear to the lower ring gear, radial bearing members secured one each to the upper housing and to the lower housing and projecting inwardly into bearing engagement with the common transmission shaft, means secured to the common transmission shaft and resting upon one of the radial bearing means to rotatably mount the ring gears, and means coupling the radial bearing secured to the upper housing to the common transmission shaft to index the upper housing.

5. An unloader for removing material from a structure having a first conveyor means adapted to transport material horizontally and a second conveyor means, which comprises a transmission interconnecting the second conveyor means to actuate the first conveyor means, said transmission including a rotating member having a vertical axis of rotation, a friction drive and bearing plate-like member secured to the rotating member and projecting radially outwardly, a bearing support arranged to engage the underside of the friction drive and bearing plate-like member to rotatably support the rotating member, a carrier for the first conveyor, and a bearing means secured to the carrier and resting upon the upper surface of the friction drive and bearing plate-like member to rotatably carry the first conveyor means inside the structure for angular travel within the structure.

6. An unloader for removing material from a structure having a first conveyor means and a second conveyor means mounted in the structure and above the first conveyor means for moving of material in a horizontal direction, which comprises a gear train mounted within the structure to interconnect the conveyor means, said gear train including a ring gear having a vertical axis of rotation, a friction and bearing plate centrally secured to the ring gear and projecting radially outwardly, a bearing support arranged to engage the friction and bearing plate to rotatably support the ring gear, a carrier support for the second conveyor means, and a bearing means secured to the carrier support and resting upon the upper surface of the friction and bearing plate to rotatably carry the second conveyor means for angular travel within the structure.

7. An unloader for removing material from a structure having a generally horizontal wall with an opening connecting the structure to a discharge passage and having an inner auger conveyor for transporting material to the opening and an outer power driven auger conveyor in said discharge passage, which comprises a gear train mounted within the opening to operatively interconnect the adjacent ends of the augers, said gear train including a ring gear having an axis perpendicular to the axis of the auger conveyor and bevel gears secured at least one each to each of said augers and meshing with said ring gear, a friction drive and bearing plate centrally secured to the ring gear and projecting radially outwardly, a bearing support arranged to engage the friction drive and bearing plate to rotatably support the ring gear, a carrier support for the inner auger conveyor, and a bearing means secured to said carrier support and resting upon the upper surface of the friction drive and bearing plate to angularly index the inner auger conveyor within the structure.

8. An unloader for removing material from a structure having a generally horizontal wall with a vertical opening connecting the structure to a discharge passage and having a rotatable sweep conveyor means inside said structure and a rotatable discharge conveyor means in said discharge passage, which comprises an upper and a lower cup-shaped enclosure defining a cylindrical housing having a smaller diameter than said opening, said housing being mounted within the opening with the lower cup-shaped enclosure in the opening and with the upper cup-shaped enclosure in the structure, a transmission having an input shaft journaled within the lower cup-shaped enclosure and projected outwardly into a driven connection to said discharge conveyor means, an output shaft of the transmission journaled within the upper cup-shaped enclosure and projected outwardly into a drive connection to said sweep conveyor means, said transmission including a rotatable central ring support with an upper and a lower transmission member respectively coupled with the said output shaft and said input shaft, friction drive and bearing projection means secured to the outer periphery of the central ring support and projecting radially between the facing edges of said cup-shaped enclosures, and bearing means secured to the said enclosures with bearing surfaces cooperatively engaging said projection means to rotatably support the ring support upon the lower cup-shaped enclosure and the upper cup-shaped enclosure upon the projection means, the friction forces between said projection means and the bearing means of said upper cup-shaped enclosure being selected to index the sweep conveyor means within the storage structure to successively remove layers of material from within the structure.

9. An unloader for removing material from a structure having a generally horizontal wall with a vertical opening connecting the structure to a discharge passage and having a rotatable sweep conveyor means inside said structure and a rotatable discharge conveyor means in said discharge passage, which comprises an upper and a lower cup-shaped enclosure defining a cylindrical housing having a smaller diameter than said opening, said housing being mounted within the opening with the lower cup-shaped enclosure in the opening and with the upper cup-shaped enclosure in the structure, a transmission having an input shaft journaled within the lower cup-shaped enclosure and projected outwardly into a driven connection to said discharge conveyor means, an output shaft of the transmission journaled within the upper cup-shaped enclosure and projected outwardly into a drive connection to said sweep conveyor means, said transmission including a central rotatable ring support with an upper and a lower transmission member respectively coupled with the said output shaft and said input shaft, friction drive and bearing projection means secured to the outer periphery of the central ring support and projecting radially between the facing edges of said cup-shaped enclosures, annular bearing means secured within each of the enclosures and having bearing surfaces engaging the projection means in rotatable supporting relation, and a radial bearing means in each of the annular bearing means engaging the outer circumference of the ring support to radially locate and support the ring support.

10. An unloader for removing material from a structure having a generally horizontal wall with a vertical opening connecting the structure to a discharge passage and having a rotatable sweep conveyor means inside said structure and a rotatable discharge conveyor means in said discharge passage, which comprises an upper and a lower cup-shaped enclosure defining a cylindrical housing having a smaller diameter than said opening, said housing being mounted within the opening with the lower cup-shaped enclosure in the opening and with the upper cup-shaped enclosure in the structure, a transmission having an input shaft journaled within the lower cup-shaped enclosure and projected outwardly into a driven connection to said discharge conveyor means, an output shaft of the transmission journaled within the upper cup-shaped enclosure and projected outwardly into a drive connection to said sweep conveyor means, said transmission including a central ring support coaxially mounted within the housing and having bevel ring gears secured to the opposite ends of the ring support and including bevel gears mating with said ring gears and attached to said input shaft and said output shaft on opposite sides of said ring support, friction drive and bearing projection means secured to the outer periphery of the ring support and projecting radially between the facing edges of the cup-shaped enclosures, and bearing means secured to the said enclosures with horizontal bearing surfaces engaging the projection means in rotatable supporting relation and vertical bearing surfaces engaging the outer circumference of the ring support to radially locate and support the ring support.

11. An unloader for removing material from a storage structure having a generally horizontal wall with a vertical opening connecting the structure to a discharge passage and having a rotatable sweep conveyor means inside said structure to move the material to the opening and a rotatable discharge conveyor means in said discharge passage to remove the material from the opening, which comprises an upper and a lower cup-shaped enclosure defining a closed end cylindrical housing having a smaller diameter than said opening, said housing being coaxially mounted within the opening with the lower cup-shaped enclosure in the opening and with the upper cup-shaped enclosure in the structure, a clutch shaft journaled within the lower cup-shaped enclosure and projected outwardly into a driven connection to said discharge conveyor means, an output shaft journaled upon said clutch shaft, a clutch releasably coupling said clutch shaft and said output shaft, a clutch control mounted exteriorly of the structure for remote control of said clutch, a drive shaft journaled within the upper cup-shaped enclosure and projected outwardly into a drive connection to said sweep conveyor means, a transmission including a drive member secured to said clutch shaft and a driven member secured to said drive shaft, a central ring support having an upper transmission member coupled to the driven member and a lower transmission member coupled to the drive member, an annular friction and bearing plate rigidly secured to the outer periphery of the central ring support and projecting radially between the facing edges of said cup-shaped enclosures, and bearing members secured to the facing ends of said enclosures and having bearing surfaces to rotatably support the ring support upon the lower cup-shaped enclosure and the upper cup-shaped enclosure upon the bearing plate, the friction forces between said bearing plate and the bearing member secured to said upper cup-shaped enclosure being selected to index the sweep conveyor means within the storage structure to successively remove layers of material from within the structure.

12. An unloader for removing material from a storage structure having a generally horizontal wall with a vertical opening connecting the structure to a discharge passage and having a rotatable inner sweep conveyor means inside said structure and a rotatable discharge power driven conveyor means in said discharge passage, which comprises an upper inverted cup-shaped enclosure and a lower cup-shaped enclosure defining a closed end cylindrical housing having a smaller diameter than said opening and being mounted within the opening with the lower cup-shaped enclosure in the opening and with the upper cup-shaped enclosure in the structure, a clutch shaft journaled within the lower cup-shaped enclosure and projected outwardly into a driven connection with the adjacent end of said discharge conveyor means, an output shaft journaled upon said clutch shaft, a mechanical clutch releasably coupling said clutch shaft and said output shaft, a push-pull actuator secured to the clutch and extending outwardly through said discharge passage for remote control, a drive shaft journaled within the upper cup-shaped enclosure and projected outwardly into a drive connection with the adjacent end of said sweep conveyor means, a gear train including bevel gears secured one each to said output shaft and said drive shaft within the corresponding enclosures, a ring gear unit having a central ring support and an upper and a lower bevel gear meshing respectively with the bevel gears on said drive shaft and said output shaft, an annular friction drive and bearing plate rigidly secured to the outer periphery of the central ring support and projecting radially between the facing edges of said cup-shaped enclosures, annular bearing members secured to the inner surfaces of said enclosures with bearing surfaces generally coincident with the plane through the corresponding enclosure edges to rotatably support the ring gear unit upon the lower cup-shaped enclosure and to support the upper cup-shaped enclosure upon the bearing plate, the friction forces between the bearing plate and the annular bearing member attached to said upper cup-shaped enclosure being selected to index the sweep conveyor means within the storage structure to successively remove layers of material from within the structure, and a plurality of equicircumferentially arranged material distributing vanes secured to the outer periphery of the bearing plate and extending radially over the discharge opening to introduce material to the discharge conveyor means.

13. An unloader for removing material from a structure having a horizontal wall with an opening connecting the structure to a discharge passage and having a sweep conveyor means inside said structure and a discharge conveyor means in said discharge passage, which comprises a gear train mounted within the opening to interconnect the conveyor means, a horizontal friction drive plate rotated in a horizontal plane by said gear train, a bearing to rotatably support said friction drive plate, a carrier for the inner end of the sweep conveyor means, and a friction bearing member secured to the carrier and mounted upon the friction plate to rotatably support the carrier and attached sweep conveyor means for automatic indexing of the sweep conveyor means within the structure.

14. An unloader for removing material from a structure having a horizontal wall with an opening connecting the structure to a discharge passage and having a sweep conveyor means inside said structure and a discharge conveyor means in said discharge passage, which comprises an upper inverted cup-shaped enclosure and a lower cup-shaped enclosure defining a divided tubular housing having a smaller outer diameter than said opening, means to mount the housing in the opening, a gear train mounted within the housing and having an input connected to the discharge conveyor means and an output connected to the sweep conveyor means, a friction drive plate driven by said gear train and mounted between the cup-shaped enclosures, a bearing secured to the upper end of the lower enclosure to rotatably support the drive plate, and a friction bearing member secured to the upper cup-shaped housing and disposed upon the friction drive plate to rotatably support the upper enclosure for automatic indexing within the structure.

15. An unloader for removing material from a structure and having a sweep conveyor means and a discharge conveyor means, which comprises a centrally divided transmission enclosure defining an upper housing rotatably supporting the sweep conveyor means and a lower housing rotatably supporting the discharge conveyor means, a transmission unit mounted within the enclosure including an upper gear in the upper housing operatively connected to drive the sweep conveyor means and a lower gear in the lower housing operatively connected to be driven by the discharge conveyor means, said transmission unit including a common shaft connecting the upper and lower gears, bearing members secured to the adjacent ends of the housings to rotatably support the upper housing upon said lower housing, and a planetary gear system connected to said common shaft and to said upper housing to continuously index the upper housing and attached sweep conveyor means within the structure.

16. An unloader for removing material from a structure and having a sweep conveyor means and a discharge conveyor means, which comprises a centrally divided transmission enclosure defining an upper housing rotatably supporting the sweep conveyor means and a lower housing rotatably supporting the discharge conveyor means, a transmission unit mounted within the enclosure including an upper gear in the upper housing operatively connected to drive the sweep conveyor means and a lower gear in the lower housing operatively connected to be driven by the discharge conveyor means and including a common support shaft having the gears secured to the opposite ends, bearing members secured to the contiguous ends of the upper and lower housing to rotatably support the upper housing upon the lower housing and including axially spaced radial portions engaging the shaft to support the upper and lower gears, and a planetary gear system connected to said common support shaft between the radial portions of the bearing members and connected to the bearing member secured to the upper housing to continuously index the upper housing and attached sweep conveyor means within the structure.

17. An unloader for removing material from a structure having a horizontal wall with an opening connecting the structure to a discharge passage and having a sweep conveyor means inside said structure and a discharge conveyor means in said discharge passage, which comprises a centrally divided transmission enclosure adapted to be mounted within the opening in the structure and defining an upper housing rotatably supporting the sweep conveyor means and a lower housing rotatably supporting the discharge conveyor means, a transmission unit mounted within the enclosure including an upper gear in the upper housing operatively connected to drive the sweep conveyor means and a lower gear in the lower housing operatively connected to be driven by the discharge conveyor means, said transmission unit including a common support shaft connected at opposite ends to the upper gear and to the lower gear, radial bearing members secured one each to the lower and upper housings and projecting radially inwardly into bearing engagement with the shaft immediately adjacent the respective gears, one of said bearing members including a vertical extension engaging the opposite bearing member to rotatably support the upper housing upon the lower housing, and a planetary gear system disposed between the radial bearing members and connected to said common support shaft and to the upper radial bearing member to continuously index the upper housing and attached sweep conveyor means within the structure.

18. An unloader for removing material from a structure having a horizontal wall with an opening connecting the structure to a discharge passage and having a sweep conveyor means inside said structure and a discharge conveyor means in said discharge passage, which comprises a centrally divided transmission enclosure disposed within the opening and defining an upper housing rotatably supporting the sweep conveyor means and a lower housing rotatably supporting the discharge conveyor means, a transmission unit mounted within the enclosure including an upper gear in the upper housing operatively connected to drive the sweep conveyor means and a lower gear in the lower housing operatively connected to be driven by the discharge conveyor means with the gears secured to opposite ends of a common support shaft disposed coaxially of the enclosure, an upper annular bearing member secured to the upper housing in axially spaced relation to the open end of said upper housing and projecting inwardly into bearing engagement with the common support shaft, a lower annular bearing member secured to the lower housing in axially spaced relation to the open end of said lower housing and projecting inwardly into bearing engagement with the common support shaft, a vertical tubular wall telescoped into the adjacent ends of the upper housing and the lower housing between the annular bearings to rotatably support the upper housing upon the lower housing, a first planetary drive having a sun gear connected to the common support shaft and a series of circumferentially spaced planet gears, planet shafts secured to the lower annular bearing member to rotatably support the planet gears in mesh with said sun gear, said first planetary drive having a ring gear mounted between the vertical wall and the planet gears in mesh with the planet gears, a second planetary drive having a sun gear secured to the common support shaft and a series of circumferentially spaced planet gears meshing with the sun gear, planet shafts secured to the upper bearing member to rotatably support the last named planet gears, and said second planetary drive including a ring gear rigidly connected for synchronous rotation with the first ring gear whereby said second planet gears are rotated about the axis of the common support.

19. An unloader for removing material from a structure having a horizontal wall with an opening connecting the structure to a discharge passage and having a sweep conveyor means inside said structure and a discharge conveyor means in said discharge passage, which comprises a centrally divided transmission enclosure disposed within the opening and defining an upper housing rotatably supporting the sweep conveyor means and a lower housing rotatably supporting the discharge conveyor means, a transmission unit mounted within the enclosure including an upper bevel gear in the upper housing operatively connected to drive the sweep conveyor means and a lower bevel gear in the lower housing operatively connected to be driven by the discharge conveyor means and connected by a common shaft to the upper bevel gear, an upper annular bearing member secured to the upper housing in spaced relation to the open end of said upper housing and projecting inwardly into radial bearing engagement with the common shaft and into thrust bearing engagement with the back of the upper bevel gear, a lower annular bearing member secured to the lower housing in spaced relation to the open end of said lower housing and projecting inwardly into radial bearing engagement with the common shaft and into thrust bearing engagement with the back side of the lower bevel gear, at least one of said annular bearing members including a longitudinal wall between the annular bearings immediately adjacent the inner surface of the enclosure to rotatably support the upper housing upon the lower housing and to support the transmission unit, a first planetary drive disposed in bearing engagement with the back side of the lower bevel gear and having a sun gear connected to the common shaft and a series of circumferentially spaced planet gears, planet shafts secured to the lower annular bearing to rotatably support the planet gears in mesh with said sun gear, said first planetary drive having a ring gear rotatably mounted between the vertical wall and the planet gears in mesh with the planet gears, a second planetary drive disposed in bearing engagement with the back side of the upper bevel gear and having a sun gear secured to the common shaft and a series of circumferentially spaced planet gears meshing with the sun gear, planet shafts secured to the upper bearing member to rotatably support the last named planet gears, said second planetary drive including a ring gear in mesh with said second planet gears and rigidly connected for synchronous rotation with the first ring gear whereby said second planet gears and attached upper housing are rotated about the axis of the common support, and a spacing and bearing plate disposed between the first and second planetary drives.

20. An unloader for removing material from a structure having a horizontal wall with an opening connecting the structure to a discharge passage and having a sweep conveyor means inside said structure and a discharge conveyor means in said discharge passage, which comprises a centrally divided transmission enclosure disposed within the opening and defining an upper housing rotatably supporting a sweep means and a lower housing rotatably supporting a discharge means, a transmission unit mounted within the enclosure including an upper gear in the upper housing operatively connected to drive the sweep conveyor means and a lower gear in the lower housing operatively connected to be driven by the discharge conveyor means and connected by a common support to the upper gear, means to rotatably support the upper housing upon the lower housing, a first planetary drive having a sun gear connected to the common support and a series of circumferentially spaced planet gears, planet shafts secured to the lower housing to rotatably support the planet gears in mesh with said sun gear, said first planetary drive having a ring gear rotatably mounted in mesh with the planet gears, a second planetary drive having a sun gear secured to the common support and a series of circumferentially spaced planet gears meshing with the sun gear, planet shafts secured to the upper housing to rotatably support the last named planet gears, and said second planetary drive including a ring gear in mesh with said second planet gears and rigidly connected for synchronous rotation with the first ring gear whereby said second planet gears and the attached upper housing are rotated about the axis of the common support.

References Cited in the file of this patent
UNITED STATES PATENTS 2,233,085     Schweickart et al. _____ Feb. 25, 1941